June 25, 1929.    J. L. WINKLER    1,718,510
ROTARY HOE ATTACHMENT FOR CULTIVATORS
Filed Oct. 15, 1928
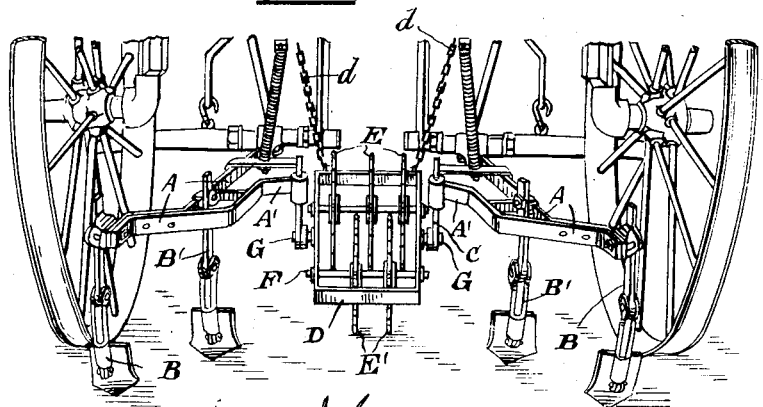
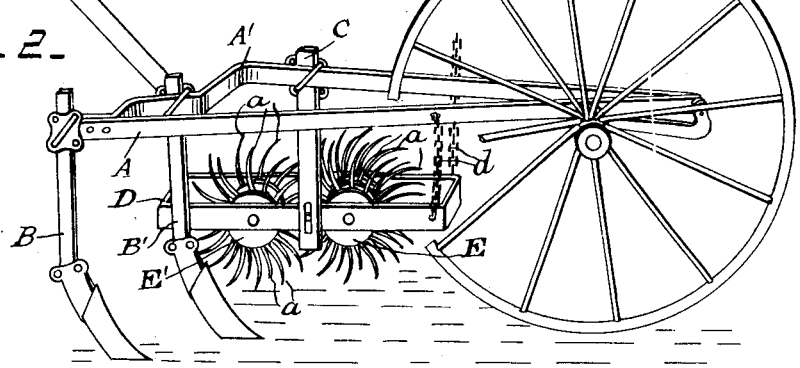
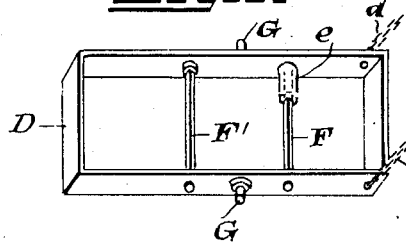
Inventor
John L. Winkler Patented June 25, 1929.

1,718,510

UNITED STATES PATENT OFFICE.

JOHN L. WINKLER, OF RITTMAN, OHIO.

ROTARY HOE ATTACHMENT FOR CULTIVATORS.

Application filed October 15, 1928. Serial No. 312,484.

My invention relates to improvements in wheeled cultivators of corn and the like, and particularly to the combination therewith of a rotary hoe attachment for such cultivators; and its principal objects are to provide improved means for cultivating the soil upon and along the plant rows simultaneously with the cultivation of the soil between such rows, whereby the ground along the path made by the ordinary corn planter is loosened and weeds and grass growing therealong and about the hills of growing plants are uprooted without damaging the plants; and at the same time the cultivator shovels, such as are commonly employed in cultivating growing corn and the like, break up the soil between the rows thereof in the usual manner; and secondly, to so construct and operate the rotary hoes between the adjacent shovels of the cultivator, that the said hoes, while digging into the soil, also serve as fenders to prevent the clods and soil turned up by said adjacent shovels from covering up or otherwise damaging the growing plants; and lastly, to provide means whereby the rotary hoes may shift position both longitudinally and laterally to pass over uneven ground and also be adapted to the vertical and lateral movement of the shovel plow beams. It consists of the arrangement and combination of elements hereinafter set forth and stated in the appended claim.

My invention is illustrated by the accompanying drawings in which similar letters and figures of reference indicate like parts. Referring thereto, Fig. 1 is a rear end view of the lower portion of a cultivator, such as commonly used, with my rotary hoe attachment supported between adjacent shovel plow beams. Fig. 2 is a side view of one side of an ordinary wheel cultivator, with the rotary hoe attachment in position thereon. Fig. 3 is a plan view of my rotary hoe attachment detached from the cultivator. Fig. 4 is a perspective detail view of the frame of the rotary hoe attachment; and Fig. 5 is a detail view of one of the rotary hoe disks detached.

In the drawings, A, A' are cultivator plow beams such as commonly employed, and B, B' are attached standards for the shovels of the cultivator. It will be understood that Fig. 2 shows only one side and so much of the cultivator as is required to exhibit the mechanism of the combination, and description of like portions is omitted as unnecessary. C is a depending arm which is removably and adjustably secured at its upper end to the inner plow beam A', and supports the frame D of the rotary hoe attachment by means of a projecting stud G, the stud being located about midway between the pair of axles F, F' on which the several hoe disks E, E' rotate. On the forward axle three of said disks are spaced apart by intervening sleeves e, e; and on the rear axle a pair of like disks are spaced apart so as to intermesh with said forward disks in the usual well known way of rotary hoe cultivators, and no claim is made herein to the said disks, specifically. They are preferably mounted on a square axle, or otherwise secured thereon so as to rotate in unison, and the sleeves e are adapted to surround the angular axles, and secure the disks in proper distances apart, and said axles have suitable end bearings in the frame D so as to rotate therein. Other means of supporting the disks may be employed if desired. To accommodate the longitudinal rocking movement of the rotary hoe frame over uneven ground, the studs G, G are located slightly forward of the middle of the frame D, and the forward end of the latter is adjustably supported vertically by means of a pair of supporting cables d, d; and to accommodate the sidewise rocking movement of said frame, and to permit the latter to rock a limited distance independently of the action of the plow beams A, the lower ends of the pair of supporting arms C, C, are provided with elongated bearings to engage the studs, as shown in Fig. 2.

Thus the rotary hoe disks are supported by the frame D at such a level with the ground as may be desired, and enter the soil by their own weight and the traction of the cultivator, which also supports them cooperatively with the shovel gangs and the plow beams thereof, and they may be raised or lowered therewith, and their depth in the soil regulated to suit the requirements of the soil and the action of the said cultivator shovels.

I make no claim specifically to the said cultivator, except in combination with said rotary hoe attachment, and the same may be modified in any manner conformable thereto.

What I claim is—

In a wheeled cultivator, the combination with the plow beams and shovels thereof, of a rotary hoe attachment therefor, comprising a frame suspended adjacent to and between said cultivator shovels, a pair of draft standards adjustably secured to corresponding cultivator beams, elongated bearings at the lower ends of said standards, respectively; a pair of studs on opposite sides of said frame adapted to engage said bearings pivotally, a pair of shafts extended laterally in said frame spaced apart from said studs, the forward shaft at a less distance therefrom than the rearward shaft, a triple set of rotary hoe disks mounted on said forward shaft, and a pair of like disks mounted on the rearward shaft; means for spacing apart said several disks on each shaft a predetermined distance, and means, including a pair of cables attached to the forward end of said frame, and to said cultivator to support said forward end adjustably, substantially as set forth.

In witness whereof, I hereunto set my hand this 16th day of June, A. D. 1928.

JOHN L. WINKLER.